US005582887A

United States Patent [19]

Etheredge

[11] Patent Number: 5,582,887

[45] Date of Patent: Dec. 10, 1996

[54] TAMPER-EVIDENT TAPE HAVING DISCONTINUOUS BARRIER LAYER

[75] Inventor: Robert W. Etheredge, Natick, Mass.

[73] Assignee: The Kendall Company, Mansfield, Mass.

[21] Appl. No.: 162,245

[22] Filed: Dec. 6, 1993

Related U.S. Application Data

[63] Continuation-in-part of Ser. No. 82,199, Jun. 24, 1993, which is a continuation-in-part of Ser. No. 913,328, Jul. 15, 1992, abandoned, which is a continuation-in-part of Ser. No. 693,902, May 1, 1991, abandoned, which is a continuation of Ser. No. 395,128, Aug. 17, 1989, abandoned.

[51] Int. Cl.[6] .............................. B42D 15/00; B32B 7/12; B65D 50/00

[52] U.S. Cl. .......................... 428/41.5; 428/201; 428/202; 428/203; 428/354; 428/916; 428/352; 428/448; 428/213; 428/500; 428/483; 428/915; 383/5; 206/807; 53/485; 283/108; 283/81

[58] Field of Search .............................. 428/40, 201, 202, 428/203, 354, 916, 352, 448, 213, 500, 483, 915; 383/5; 206/807; 53/485; 283/108, 81

[56] References Cited

U.S. PATENT DOCUMENTS

| | | | |
|---|---|---|---|
| 3,623,944 | 11/1971 | Davis | 156/246 |
| 3,864,855 | 2/1975 | Pekko et al. | 283/8 |
| 4,121,003 | 10/1978 | Williams | 428/40 |
| 4,608,288 | 8/1986 | Spindler | 428/40 |
| 4,763,931 | 8/1988 | Matsuguchi et al. | 428/916 |
| 5,153,042 | 10/1992 | Indrelie | 428/40 |
| 5,232,527 | 8/1993 | Vernhey et al. | 428/195 |
| 5,277,971 | 1/1994 | Weng et al. | 428/916 |
| 5,294,470 | 3/1994 | Ewan | 428/40 |

*Primary Examiner*—William P. Watkins, III
*Attorney, Agent, or Firm*—David J. Koris

[57] ABSTRACT

Disclosed is a tamper-evident tape for applying over the flap or other opening in cellulosic substrates such as paper products, corrugated containers, cardboard boxes, shipping cartons and the like, which tape will provide evidence of tampering with its contents over a wide temperature range from above to below the Tg of the adhesive layer adhering the tape to the substrate. The tape has a transparent backing layer carrying on one side thereof a discontinuous layer of deposits of a transparent barrier material which is bonded to the backing layer and which prevents bonding of an underlying colored layer to the backing layer in areas where the barrier material is present.

12 Claims, 2 Drawing Sheets

TAMPER-EVIDENT TAPE HAVING DISCONTINUOUS BARRIER LAYER

RELATED APPLICATION

This application is a continuation-in-part of application Ser. No. 08/082,199 filed Jun. 24, 1993, which is a continuation-in-part of Ser. No. 07/913,328 filed Jul. 15, 1992 (now abandoned), which is a continuation-in-part of Ser. No. 07/693,902 filed May 1, 1991 (now abandoned) which in turn is a continuation of Ser. No. 07/395,128 filed Aug. 17, 1989 and also now abandoned.

BACKGROUND OF THE INVENTION

The aforementioned copending application, Ser. No. 08/082,199 and its parent applications relate to a tamper-evident tape for application over the flap or other opening in pouches, bags, envelopes and the like, which tape will provide evidence of tampering over a wide temperature range from above to below the Tg of the adhesive layer adhering the tape to the substrate to be protected from tampering.

As is described and claimed therein, the tamper-evident adhesive tape comprises a transparent backing layer carrying on one side thereof, in order:

(1) a discontinuous layer of deposits of a transparent barrier material bonded to the backing;

(2) a colored layer chemically bonded to the backing layer in areas where there are no barrier material deposits, the barrier material preventing chemical bonding of the colored layer to the backing layer in areas where the barrier material is present; and (3) an acrylic pressure sensitive adhesive layer for securing the tape to the container where any evidence of tampering is desired, the chemical bond strength between the backing layer and colored layer being greater than the adhesion strength between the colored layer and the adhesive layer securing the tape to the container both above and below the Tg of the adhesive layer, whereby when attempt is made to remove the tape from the container to gain access to its contents, the colored layer will remain with the backing in areas where they are chemically bonded while in areas where barrier material is present to prevent chemical bonding, the colored layer will adhere to the adhesive layer to provide a colored pattern or image evidencing tampering with the container which is visible to the eye, which evidence remains visible to the eye when an attempt is made to reapply the colored layer and backing to the adhesive layer.

A tamper-evident tape embodying the aforementioned invention and which is manufactured and sold by The Kendall Company, assignee of the instant invention and of the aforementioned earlier applications, has achieved considerable commercial success. However, it has been found that while the tape is entirely efficacious for use on plastic substrates, it should not be employed on substrates whose cohesive strength is smaller than the adhesion between any of the layers of the tape, e.g. substrates such as paper products, corrugated containers, cardboard containers, shipping canons and other such cellulosic materials.

Accordingly, stated simply, the task of the present invention can be said to modify the aforementioned commercially available tamper-evident tape currently employed with pouches, bags, envelopes or other plastic containers for currency, security documents and the like, to provide a tape which can be employed as a tamper-evident seal for cellulosic materials such as those mentioned above.

BRIEF DESCRIPTION OF THE INVENTION

In accordance with the present invention, this task is solved in an elegant manner by providing as the tamper-evident tape a transparent backing layer at least the inner surface of which is of a matte finish (for reasons to be described hereinafter), the layer carrying on its inner surface, in order:

(1) a discontinuous layer of deposits of a transparent barrier material;

(2) a colored layer chemically bonded to the backing layer in areas where there are no barrier material deposits.

(3) a pressure-sensitive adhesive layer tailored to possess a cohesive strength weaker than that of the substrate to which the tape is to be applied; and (4) an acrylic pressure-sensitive adhesive layer for securing the tape to the substrate.

Layers (1), (2), and (4) of the present invention are essentially the same as layers (1),(2) and (3) described above in the description of the invention of the earlier copending application, the essence of the invention being the addition of the weak cohesive force layer (3) along with having a matte finish on at least the inner surface of the backing layer.

DETAILED DESCRIPTION OF THE INVENTION

As previously alluded to, the present invention can be described as a modification of the tamper-evident tape described and claimed in the aforementioned parent application, Ser. No. 08/082,199, which modification was initiated and motivated by the discovery that the current commercially available tape of that invention was not applicable for use with cellulosic substrates such as newspaper and other paper products, corrugated containers, cardboard boxes and shipping canons and the like.

Such substrates are characterized as having relatively week cohesive strength as compared with plastic substrates which are utilized for next-day mail delivery containers, pouches, bags, envelopes and the like for currency, security or confidential documents, etc. With the cellulosic containers, it has been found that the cellulosic substrate will break or tear before the tamper-evidence of the tape is provided. After tampering with the contents, it is then possible to repair the damage to the container substrate and replace the intact tape so that the tampering would go undetected.

In accordance with the present invention the task of this invention to provide a tamper-evident seal for cellulosic products is solved by including in the tape a layer (to be described in detail hereinafter) a layer whose cohesive strength is tailored so as to be weaker than the cohesive strength of the substrate material to which it is applied.

The invention will best be understood by reference to the following detailed description taken in conjunction with the accompanying drawing.

Figure 1:
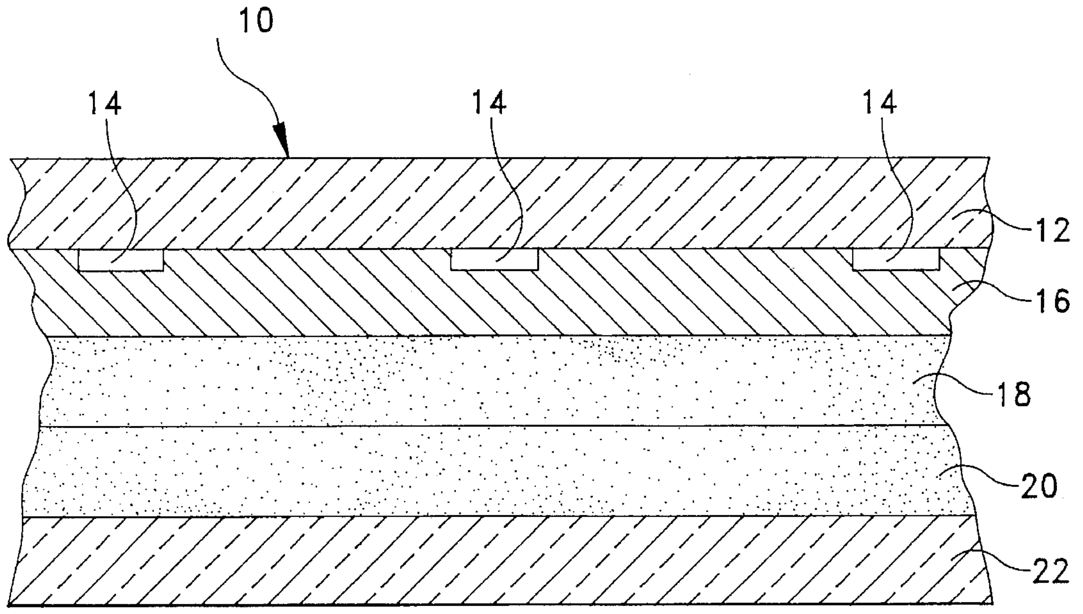
FIG. 1 is a diagrammatic cross-sectional view of the tamper-evident tape of this invention.

As shown in FIG. 1, the novel tamper-evident disclosure 10 of this invention will comprise an adhesive tape having a transparent backing 12 carrying, in order, a discontinuous layer 14 of a barrier material; a colored layer 16 chemically bonded to backing layer 12 in areas where there is no barrier material 14; a layer 18 comprising a continuous phase of a pressure-sensitive adhesive and a discontinuous phase of an inert filler material, layer 18 being characterized as being of brittle and relatively low cohesive strength; and a layer 20 of a pressure-sensitive adhesive characterized as being aggressive, i.e. possessing a high peel-shear strength, for adhering the tape over the mouth or opening of the container to be secured. While not essential to the practice of the invention, the tape most preferably will also have a release sheet 22 covering and protecting adhesive layer 20 prior to use.

Backing layer 12 will comprise a transparent polymeric material which is "compatible" with the colored underlying layer 16 in the sense that they can be chemically bonded together, as previously mentioned. The preferred compatible material for forming layers 12 and 16 will be selected from the per se known polyesters.

For example, backing layer 12 may be on the order of from about 0.5 to about 3.0 mils thick, 1.0 mil being preferred, comprised of a polyester such as "MYLAR", trademark of E.I. Dupont de Nemours & Co. for a durable, transparent, water-repellant film of polyethylene terephthalate resin.

As alluded to earlier, at least the inner surface 12*a* of backing layer 12 will have a matte finish. In accordance with this invention it was found that where the surface of the backing layer carrying the other layers of the tape is smooth, as would be customary, it is possible to tamper with the contents and then carefully replace the tape so that the tampering is not readily discernible to the eye. However, when the surface is matte, it is not possible to do so. Accordingly, an essential part of this invention is to provide a matte finish on at least the inner surface of the backing layer. While the outer surface may also be matte, if desired, it will be understood that this is not essential to the practice of the invention.

Systems for providing a matte finish on a sheet material are of course quite old and well known and will accordingly per se comprise no part of this invention. For example, layer 12 may be prepared by a calandering technique wherein the molten polyester material is applied between the nip of superposed calendering rolls at least one of which has a matte rather than a smooth surface. As is known, the rolls are positioned at the desired gap to provide the requisite thickness to the layer 12.

Colored layer 16, which may be on the order of 0.1 to 0.6 mil thick, is characterized by possessing a covalent bond between the backing 12 which is stronger than the adhesion at the interface between layer 16 and pressure-sensitive adhesive layer 18, so that any attempt to remove the tape from the container will result in separation of the backing 12 with chemically bonded layer 16 from the underlying adhesive layer, with at least a portion of colored layer 16 in areas corresponding to areas containing barrier material 14 adhering to the underlying adhesive layer 18 to reveal a pattern on the container in terms of the colored material adhering to the adhesive layer still secured over the opening of the container.

The covalent bond between colored layer 16 and backing 12 will retain the preferential adherence of layer 16 to the backing even in the cold, e.g. when sprayed with liquid nitrogen to a temperature of on the order of −320° F.

Layer 16 is also characterized as being relatively soft and pliant so that under the force of removal it will convolute or distort, making it impossible to overlay it again on the adhesive layer precisely so that the tampering will not be visibly revealed.

As alluded to earlier, layer 16 comprises a "compatible" material with backing 12 in the sense that it will chemically bond to the backing in areas where there is no barrier material 14. Bonding of layers 12 and 16 may be accomplished by crosslinking and where layer 12 comprises a polyester, layer 16 will also comprise a polyester, either or both layers additionally containing a crosslinking agent to provide the chemical bond between the layers. In the preferred embodiment layer 16 will contain diisocynate crosslinker in an amount sufficient to effect sufficient crosslinking to provide a covalent bond between the two layers having cohesive strength greater than the adhesion between layer 16 and the underlying adhesive layer 18.

The amount of crosslinker, that is, the ratio of crosslinker to crosslinkable material in layer 16 will in part be dependent upon the crosslinkable materials and is not capable of precise quantification. Accordingly, the amount to be employed will be understood by those skilled in the art as being an "effective amount", i.e. an amount effective to produce the desired chemical bond between the two layers of greater strength than the bond between layers 16 and 18.

While the selection of appropriate proportions will only require routine experimentation within the expected judgment of the skilled worker in the light of the foregoing discussion, for purposes of illustration a solution of polyester and diisocyanate crosslinker may be provided in a suitable organic solvent such as ethyl acetate, the ratio by weight of polyester to crosslinker being on the order of from about 95:5 to about 60:40.

As heretofore mentioned, layer 16 will contain a suitable color-providing material, e.g. a non-migrating dye or pigment having suitable spectral absorption characteristics and density so as to be readily visible to the eye when layer 16 is viewed through transparent backing layer 12.

A preferred polyester for layer 16 is "Pentaflex" obtained initially from Wittaker Corporation and now commercially available from Natural Starch & Chemical Company, a subsidiary of Unilever United States, Inc., under the trade designation 30-6066 and which is characterized as being soft and tacky. Other useful polyesters may, for example, be selected from those disclosed in U.S. Pat. Nos. 4,581,093; 4,487,909; 4,486,508 and 4,419,476, all assigned initially to Wittaker corporation and subsequently to Natural Starch & Chemical Company.

Suitable crosslinking agents include those disclosed, for example, in the aforementioned U.S. Pat. No. 4,581,093, e.g. isocyanate crosslinkers such as toluene diisocyanate (TDI); 4,4'-methylene-bis (diphenyl diisocyanate); the 5/2 molar adduct of TDI and trimethylolpropane; the 2/1 molar adduct of TDI and diethylene glycol; 1,6-hexamethylene. diisocyanate, etc.

The barrier material 14, which is preferably applied in a pattern but which may be randomly adhered to the backing, may comprise any material which bonds aggressively to backing 12. Examples of such materials include silicone, fluorocarbons, Quilon (trademark of E.I. DuPont de Nemours & Co.), polyoctadecyl carbonate, etc., silicone being preferred. Barrier material 14, whose function is to prevent adherences of the underlying colored layer 16 to backing 12 in areas of deposit of barrier material, is transparent or translucent so that the underlying colored layer 16 may be seen therethrough when viewed through the transparent backing. The barrier material deposits may, for example be on the order of about 1.0 micron thick. They may be strongly secured to the inner surface of the backing by per se known techniques such as gravure or flexible printing, spray coating, chemical etching and the like.

Layer 18, the other essential novelty upon which patentability is here predicated and which may be on the order of 1.0–4.0 mils thick, comprises a layer of an acrylic pressure-sensitive adhesive as a continuous phase in which a quantity of inert filler particles has been incorporated as a discontinuous phase so as to provide a brittleness and loss of cohesive strength and tack such that the integrity of the tape will be weaker than the cohesive strength of the substrate to which the tape is bonded, whereby tearing of the substrate will be precluded at all perceived peel rates for removing the tape from the substrate.

An important advantage of the invention is that the cohesive strength and tack of layer 18 may be tailored over a wide range to accommodate the particular substrate which is contemplated, simply by varying the ratio of inert particles in the discontinuous phase to adhesive in the continuous phase.

Accordingly, the amounts or ratios of inert particles to be employed are not subject to precise quantification. Rather they involve routine experimentation within the expected judgment of the skilled worker in the light of the foregoing description whereby the ratios are determined by employing varying amounts in layer 18 and testing the resulting tamper-evident tape on the particular substrate contemplated for application of the tape to prevent tampering.

Accordingly, as used in the appended claims, the amount of inert filler particles in layer 18 will be defined as an "effective amount", meaning the amount required to render the cohesive strength of layer 18 weaker than the cohesive strength of the strength of the substrate to which the tape is to be applied.

By way of illustration, it is contemplated that the amount of inert particles to be employed may be such as to provide a ratio by weight of the particles to the adhesive from about 5:95 to about 90:10, a ratio of from about 80:20 to about 85:15 filler to adhesive, by weight, being illustrative for application to corrugated boxes.

The continuous phase of adhesive in layer 18 may comprise any of the known acrylic pressure-sensitive adhesives. Accordingly, the selection of the particular acrylic adhesive to be employed is not critical, per se comprises no part of this invention and will be a matter of choice within the expected judgment of the skilled worker in the light of this description.

As heretofore mentioned, the filler for reducing the cohesive strength of the layer is inert in the sense that it has no substituents, e.g. hydroxyl groups or the like which can react with the adhesive moiety to maintain or enhance the cohesive strength of the layer. Suitable inert non-reinforcing particulate materials include aluminum trihydrate (ATH), calcium carbonate, talc, etc, ATH being found to be particularly suitable.

Adhesive layer 20 laminating the tape to the substrate may be on the order of 1.0–2.0 mils thick and may comprise any of the known acrylic pressure-sensitive adhesive formulations for strongly or aggressively adhering the tape. Tackifiers and/or plasticizers may be incorporated in the acrylic adhesive to increase adhesion.

The novel tamper-evident tape described above will be characterized in terms of adhesive strength as follows:

(1) the adhesion of backing layer 12 to colored layer 16 is greater than the adhesion of any of the other layers;

(2) the adhesion of colored layer 16 to adhesive layer 18 is greater than that of layer 16 to barrier material 14;

(3) the adhesion of layer 18 to adhesive layer 20 is greater than that of colored layer 16 to adhesive layer 18;

(4) the adhesion of layer 20 to the substrate is greater than the adhesion of colored layer 16 to layer 18;

(5) the adhesion of barrier material 14 to colored layer 16 is lowest of all; and (6) the cohesive strength of the substrate is greater than the bond between layers 16 and 18.

In use, the tape will of course be applied sealing the mouth or other opening in the container to be protected from tampering. When the tape is removed above the Tg of layer 20, e.g. at ambient temperatures or higher, so as to tamper with the contents, in areas where no barrier material is present, the colored layer 16 will remain with the backing, as heretofore alluded to. However, in areas where barrier material 14 is present so as to preclude adhesion of colored layer 16 to the backing, the colored layer will be stripped away from the barrier, adhering to adhesive layer 18 which in turn remains bonded to the substrate by means of adhesive layer 20. This will in turn provide a colored pattern or positive image on the substrate in terms of adhered colorant from layer 16 and a reverse contrast or negative image visible through the stripped-off backing in terms of the remaining colored layer and areas where there is no colorant visible through the backing. Even when an attempt is made to re-apply the tape precisely to the substrate, evidence of its removal will still be readily visible to the eye, due to mismatch of irregular surfaces on the print and backing when overlaid.

When the tape is removed below the Tg of the adhesive, e.g. by first spraying with liquid nitrogen, and then removing the tape, visual evidence of the tampering will also be exhibited in one or more of the following ways.

First, when the tape is removed from the substrate, adhesive layer 18 delaminates from colored layer 16 except where barrier layer 14 is present. At these areas, colored layer 16 breaks from barrier layer 14 and transfers with adhesive layers 18 and 20. It is important to note, that if a rubber-based adhesive were to be employed for layer 18, the rubber-based adhesive layer will delaminate from colored layer 16 in the cold without breaking layer 16 as herein contemplated. It will therefore be understood that rubber-based adhesives should not be used for layers 18 or 20.

A second possible evidence of tampering, is that the backing is liable to tear, leaving an image on the substrate along with the evidence of tearing of the backing.

A third evidence which may occur is a noticeable wrinkling or distortion of the substrate.

The following examples shows by way of illustration and not by way of limitation the practice of this invention.

EXAMPLE 1

On a MYLAR backing approximately 1.0 mil thick a discontinuous layer of silicone approximately 1.0 micron thick was flexible printed in a pattern (layer 14) repeatedly spelling out "OPENED". A solution comprising 43.0 gms of ethyl acetate, 43.0 gms of Pentaflex 56066 (now commercially available from Natural Starch & Chemical Company under the trade designation 30-6066), 3.0 gms of the isocyanate crosslinker, TDI from Natural Starch & Chemical Company under the trade designation 30-6806, and 9.0 gms of copper phthalocyanine, a blue pigment was then coated thereover to provide a layer (16) about 0.2–0.3 mil thick. After drying to remove the solvent, an adhesive layer comprising about 15 parts by weight of a water-based latex acrylic pressure-sensitive adhesive as continuous phase and about 80 parts by weight of aluminum trihydrate was coated over colored layer 16 to provide adhesive layer (18). Finally, a water-based latex acrylic pressure-sensitive adhesive of the formulation employed in the above adhesive layer continuous phase was coated thereover to provide a layer (20) approximately 1.5 mils thick. A standard 2.5 mils thick high density polyethylene release liner (22) was then applied thereover.

EXAMPLES 2–6

The procedure recited in Example 1 was repeated five more times, varying the parts by weight from 80 (as recited in Example 1) to 81, 82, 83, 84 and 85 respectively.

EXAMPLE 7

Figure 2:
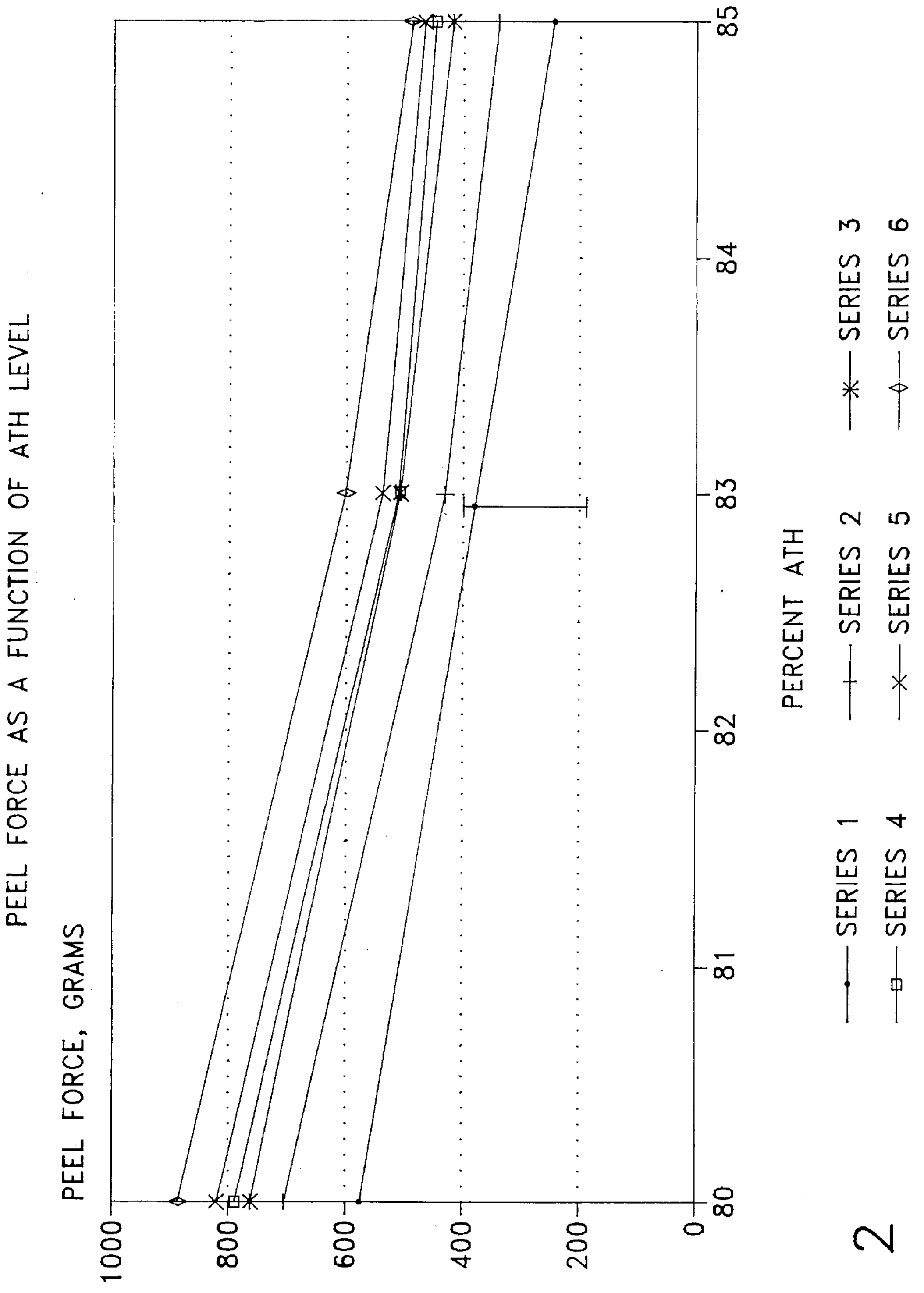
FIG. 2 is a graph depicting the peel force of illustrative tapes of this invention at various speeds of separation from a substrate.

In this Example, a piece of tamper-evident tape as prepared in each of the six foregoing examples was applied to a corrugated cardboard box and peel force as a function of aluminum trihydroxide (ATH) was determined by peeling the tapes at various speeds. In series 1, the tape was pulled at the rate of one inch per minute; in series 6, the tape was pulled at a speed of fifty inches per minute and in series 2–5 the tapes were pulled at various intermediate speeds. These speeds constituted the speeds at which one might pull the tape from the substrate. The peel force at the various speeds and tapes is shown in FIG. 2.

As seen, the peel force in grams at the various speeds of removal varied from about 250 grams to about 880 grams, depending upon the concentration of ATH filler present. Since it was determined beforehand that a peel force of an excess of 1000 grams was needed to tear the corrugated cardboard box substrate, it was then evident that the percentages by weight of filler of 80–85 are entirely satisfactory to provide a tape which will not tear the corrugated box substrate when pulled off at the perceived speed.

It will also be evident that a similar procedure can be employed as the benchmark in routine experimentation to ascertain desired levels of inert filler which are suitable for other contemnplated substrates.

From the foregoing description, including the drawing and illustrative examples, it will thus be seen that the present invention provides an elegant security closure which will provide visible evidence of tampering of cellulosic containers over a wide temperature range from hot to cold, e.g. from +150° F. to −320° F. Evidence of tampering may be readily observed by one or more of the following mechanisms provided by the closure; (1) transfer of a colored pattern to the container or other substrate; (2) revealing a printed pattern on the backing; (3) tearing of the backing; (4) color change; (5) wrinkling; and (6) finger prints.

It will be appreciated that various changes may be made without departing from the scope of the invention herein contemplated. Accordingly, it is intended that all matter contained in the foregoing description and accompanying drawing shall be taken as illustrative and not in a limiting sense.

What is claimed is:

1. A tamper-evident adhesive tape for securing over the opening in a cellulosic substrate of a container enclosing an article to be protected from tampering or unauthorized removal to provide evidence of tampering over a wide temperature range from above to below the Tg of the adhesive securing the tape to the container, comprising a transparent backing at least a surface of which is provided with a matte finish, the surface having the matte finish carrying, in order, the following layers:

(1) a discontinuous layer of deposits of a transparent barrier material bonded to the matte surface;

(2) a colored layer chemically bonded securely to the matte surface of the transparent backing in areas where there is no barrier material, the barrier material thus preventing chemical bonding of the colored layer to the backing in areas where the barrier material is present;

(3) a first acrylic pressure-sensitive adhesive layer possessing a cohesive strength weaker than that of the substrate to which the tape is to be applied, whereby tearing of the substrate will be precluded at peel forces not in excess of about 1000 grams for removing the tape from the underlying substrate; and (4) a second acrylic pressure-sensitive adhesive layer for securing the tape to the substrate, the tape being characterized in terms of adhesive strength as follows:

(a) the chemical bond of the colored layer to the backing layer being greater than the adhesive between any of the other layers;

(b) the adhesion of the colored layer to the first acrylic pressure-sensitive adhesive layer being greater than that of the colored layer to the barrier material;

(c) the adhesion of the first acrylic pressure-sensitive adhesive layer to the second acrylic pressure-sensitive adhesive layer being greater than the adhesion of the colored layer to the first pressure-sensitive adhesive layer;

(d) the adhesion of the second acrylic pressure-sensitive adhesive layer to the substrate being greater than that of the colored layer to the first acrylic pressure-sensitive adhesive layer;

(e) the adhesion of the barrier material to the colored layer being lowest of all; and (f) the bond between the colored layer and the first acrylic pressure-sensitive adhesive layer being less than the cohesive strength of the substrate.

2. A tamper-evident adhesive tape as defined in claim 1 wherein the first adhesive layer comprises a layer of an acrylic pressure-sensitive adhesive as a continuous phase and a discontinuous phase of an effective amount inert filler particles providing a brittleness and loss of cohesive strength and tack weakening the cohesive strength of the first adhesive layer.

3. A tamper-evident tape as defined in claim 2 wherein the ratio by weight of inert particles in the discontinuous phase to adhesive in the continuous phase is from about 5:95 to about 90:10.

4. A tamper-evident tape as defined in claim 2 wherein the ratio by weight of inert particles in the discontinuous phase to adhesive in the continuous phase is from about 80:20 to about 85:15.

5. A tamper-evident tape as defined in claim 2 wherein the chemical bond between the backing and colored layer is a covalent bond obtained by crosslinking the colored layer to the backing.

6. A tamper-evident tape as defined in claim 5 wherein the backing layer and colored layer each comprise a layer of a polyester material.

7. A tamper-evident tape as defined in claim 6 wherein the discontinuous layer of barrier material comprises a patternwise deposition of the barrier material.

8. A tamper-evident tape as defined in claim 7 wherein the barrier material comprises silicone.

9. A tamper-evident tape as defined in claim 3 wherein the colored layer consists essentially of a color-providing material and polyester characterized as being relatively soft and pliant so that under force of removal it will convolute or distort so that it cannot later be overlayed on the adhesive layer without evidence of its removal being visibly revealed.

10. A tamper-evident method for revealing tampering of a container having a cellulosic substrate defining an opening for access to insert or to remove an article within the container, comprising the steps of:

(1) inserting an article through the opening and into the container; and (2) thereafter sealing the opening closed by applying over the opening a tamper-evident tape as defined in claim 1.

11. A cellulosic container having an opening for inserting or removal of an article, an article disposed within the container, and a tamper-evident tape as defined in claim 1 adhered across the opening of the container to seal the opening closed.

12. A cellulosic container as defined in claim 11 wherein the container comprises a paper product, a corrugated article or a cardboard box.

* * * * *